(12) United States Patent
Tsao et al.

(10) Patent No.: US 11,422,447 B2
(45) Date of Patent: Aug. 23, 2022

(54) ILLUMINATION SYSTEM, PROJECTION DEVICE AND COLOR WHEEL CALIBRATING METHOD

(71) Applicant: Coretronic Corporation, Hsin-Chu (TW)

(72) Inventors: Yu-Sheng Tsao, Hsin-Chu (TW); Chan-Chih Lin, Hsin-Chu (TW); Yi-Shun Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/079,511

(22) Filed: Oct. 25, 2020

(65) Prior Publication Data
US 2021/0132484 A1    May 6, 2021

(30) Foreign Application Priority Data
Nov. 1, 2019   (CN) .......................... 201911059558.6

(51) Int. Cl.
*G03B 21/20*     (2006.01)
*G02B 26/00*     (2006.01)

(52) U.S. Cl.
CPC ....... *G03B 21/2033* (2013.01); *G02B 26/008* (2013.01); *G03B 21/2053* (2013.01); *G03B 21/2066* (2013.01)

(58) Field of Classification Search
CPC .............. G03B 21/2033; G03B 21/204; G03B 21/206; G03B 21/2053; G03B 21/2066;
(Continued)

(56) References Cited

U.S. PATENT DOCUMENTS

2011/0304831 A1*  12/2011  Yoshigai .............. H04N 9/3111
                                                   353/85
2016/0316183 A1*  10/2016  Cui ....................... H04N 9/3194
(Continued)

FOREIGN PATENT DOCUMENTS

CN        1834776        9/2006
CN       105607401       5/2016
(Continued)

OTHER PUBLICATIONS

"Office Action of China Counterpart Application", dated Nov. 3, 2021, p. 1-p. 9.

*Primary Examiner* — Magda Cruz
(74) *Attorney, Agent, or Firm* — JCIPRNET

(57) ABSTRACT

An illumination system including a laser light source, a phosphor wheel, a first light detection module, a first light sensing device, and a controller is provided. A first color region boundary is formed between the first and second color regions of the phosphor wheel. The first light sensing component is located downstream of the optical path of the phosphor wheel. During the period in which the first color region is cut into the optical path of the laser beam, the laser beam passes through the first color region and is sensed with first laser beam timing information by the first light sensing component. The controller determines a first displacement value between the first label and the first color region boundary according to the first laser beam timing information and the reference color timing information. A projection device and a color wheel calibrating method are also provided.

30 Claims, 12 Drawing Sheets

(58) Field of Classification Search
 CPC .................. G03B 21/208; G03B 33/08; G03B 21/2013; G03B 21/20; G02B 26/008; G02B 27/48
 See application file for complete search history.

(56) References Cited

U.S. PATENT DOCUMENTS

2017/0104970 A1\* 4/2017 Li ........................ H04N 9/3161
2018/0249137 A1\* 8/2018 Kobayashi ............. H04N 9/312
2018/0259158 A1 9/2018 Cui et al.
2019/0018309 A1\* 1/2019 Hamamura ............ G03B 33/08
2019/0199981 A1 6/2019 Murakami
2019/0373227 A1\* 12/2019 Pan ...................... H04N 9/3155

FOREIGN PATENT DOCUMENTS

| | | |
|---|---|---|
| CN | 208188569 | 12/2018 |
| CN | 109212875 | 1/2019 |
| JP | 2007248754 | 9/2007 |
| TW | I276907 | 3/2007 |

\* cited by examiner comparing the first parameter of the first laser beam timing information with the second parameter of the sub-reference color timing information in the reference color timing information to determine the first displacement value ~ S510

S500

FIG. 7B determining whether to adjust the rotation speed of the phosphor wheel according to the first displacement value and the first preset value ~ S610

S600

FIG. 7C if the first displacement value is smaller than or equal to the first preset value, the rotation speed of the phosphor wheel is not adjusted; if the first displacement value is greater than the first preset value, the rotation speed of the phosphor wheel is adjusted ~ S612

```
┌─────────────────────────────────────┐
│ comparing the third parameter of    │
│ the blue light beam timing          │
│ information with the second         │
│ parameter of the sub-reference      │─ S1010
│ color timing information in the     │
│ reference color timing information  │
│ to determine the second             │
│ displacement value                  │
└─────────────────────────────────────┘

```
┌─────────────────────────────────────┐
│ determining whether to adjust the   │
│ rotation speed of the light filter  │
│ wheel according to a displacement   │─ S1110
│ difference between the second       │
│ displacement value and the first    │
│ displacement value                  │
└─────────────────────────────────────┘

```
┌─────────────────────────────────────┐
│ if the displacement difference is   │
│ smaller than or equal to the second │
│ preset value, the rotation speed of │
│ the light filter wheel is not       │
│ adjusted; if the displacement       │─ S1112
│ difference is greater than the      │
│ second preset value, the rotation   │
│ speed of the light filter wheel is  │
│ adjusted                            │
└─────────────────────────────────────┘

ILLUMINATION SYSTEM, PROJECTION DEVICE AND COLOR WHEEL CALIBRATING METHOD

CROSS REFERENCE TO RELATED APPLICATION

This application claims the priority benefits of China application serial no. 201911059558.6, filed on Nov. 1, 2019. The entirety of the above-mentioned patent application is hereby incorporated by reference herein and made a part of specification.

BACKGROUND OF THE DISCLOSURE

Field of the Disclosure

The disclosure relates to an illumination system, a projection device and a color wheel calibrating method.

Description of Related Art

In existing projectors, a phosphor wheel and a light filter wheel are normally provided therein, and it is required to calibrate the error of the relative rotation angle between the phosphor wheel and the light filter wheel in order to project the right color. However, the current calibrating method relies on personnel at the production line to project the color gradation image through the projector first, and then the personnel manually adjusts the rotation angle of the phosphor wheel and the light filter wheel, and visually observe the color gradation smoothness of the color gradation image during the adjustment process. This calibrating method is very time-consuming and will also result in different standards due to individual differences among personnel.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The disclosure provides an illumination system and a projection device, which have good optical quality, rapid calibrating speed and low calibrating cost.

The disclosure provides a color wheel calibrating method, which can make the illumination system and the projection device applying the calibrating method have good optical quality, and the calibrating speed thereof is fast with low calibrating cost.

Other objects and advantages of the present disclosure can be further understood from the technical features disclosed in the present disclosure.

In order to achieve one or a part or all of the above or other purposes, an illumination system in an embodiment of the present disclosure includes a laser light source, a phosphor wheel, a first light detection module, a first light sensing component and a controller. The laser light source is configured to emit a laser beam. The phosphor wheel is disposed on the optical path of the laser beam, and the phosphor wheel has a first color region and a second color region. The phosphor wheel has a first label. There is a first color region boundary between the first color region and the second color region. The first light detection module is disposed beside the phosphor wheel and is configured to emit the first detection beam. The first light sensing component is disposed beside the optical path of the laser beam and located downstream of the optical path of the phosphor wheel. The controller is electrically coupled to the first light detection module and the first light sensing component, and the controller stores reference color timing information. During the period of rotation of the phosphor wheel, the first light detection module acquires the position of the first label according to the first detection beam, and the first light detection module issues a first notification signal to notify the controller. During the period in which the first color region is cut into the optical path of the laser beam, the laser beam passes through the first color region and is sensed with first laser beam timing information by the first light sensing component. The controller determines a first displacement value between the first label and the first color region boundary according to the first laser beam timing information and the reference color timing information, and adjusts or not adjusts the rotation speed of the phosphor wheel according to the first displacement value.

In order to achieve one or a part or all of the above or other purposes, a projection device in an embodiment of the present disclosure includes the above illumination system, a light valve, a controller, and a projection lens. The laser beam outputs an illumination beam after passing at least the phosphor wheel. The light valve is disposed on the optical path of the illumination beam and converts the illumination beam into an image beam. The controller and the color timing control chip are electrically coupled to the light valve, and the color timing control chip and the controller store the reference color timing information. The projection lens is disposed on the transmission path of the image beam.

In order to achieve one or a part or all of the above or other purposes, a color wheel calibrating method in an embodiment of the present disclosure includes: providing a laser light source for emitting a laser beam; providing a phosphor wheel, the phosphor wheel has a first color region and a second color region, and the phosphor wheel has a first label, there is a first color region boundary between the first color region and the second color region; providing a first detection beam, the first light detection module acquires the position of the first label according to the first detection beam during the period of rotation of the phosphor wheel, and the first light detection module issues the first notification signal; sensing the first laser beam timing information during the period in which the first color region is cut into the optical path of the laser beam; determining the first displacement value between the first label and the first color region boundary according to the first laser beam timing information and the reference color timing information; adjusting or not adjusting the rotation speed of the phosphor wheel according to the first displacement value.

Based on the above, in the illumination system, the projection device, and the color wheel calibrating method of the embodiment of the present disclosure, the first laser beam timing information is obtained by sensing the laser beam passing through the first color region of the phosphor wheel, and the first displacement value between the first label and the first color region boundary of the phosphor wheel is determined according to the first laser beam timing information and the reference color timing information, thereby adjusting or not adjusting the rotation speed of the phosphor wheel according to the first displacement value, wherein the reference color timing information is used as the preset color timing information. Therefore, the illumination system and the projection device applying the above-described color wheel calibrating method can have good optical quality after calibration, and can be calibrated without projecting a projection image, and has a faster calibration speed.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7B to FIG. 7G are respectively flow charts of sub-steps in a step of the color wheel calibrating method.

DESCRIPTION OF EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
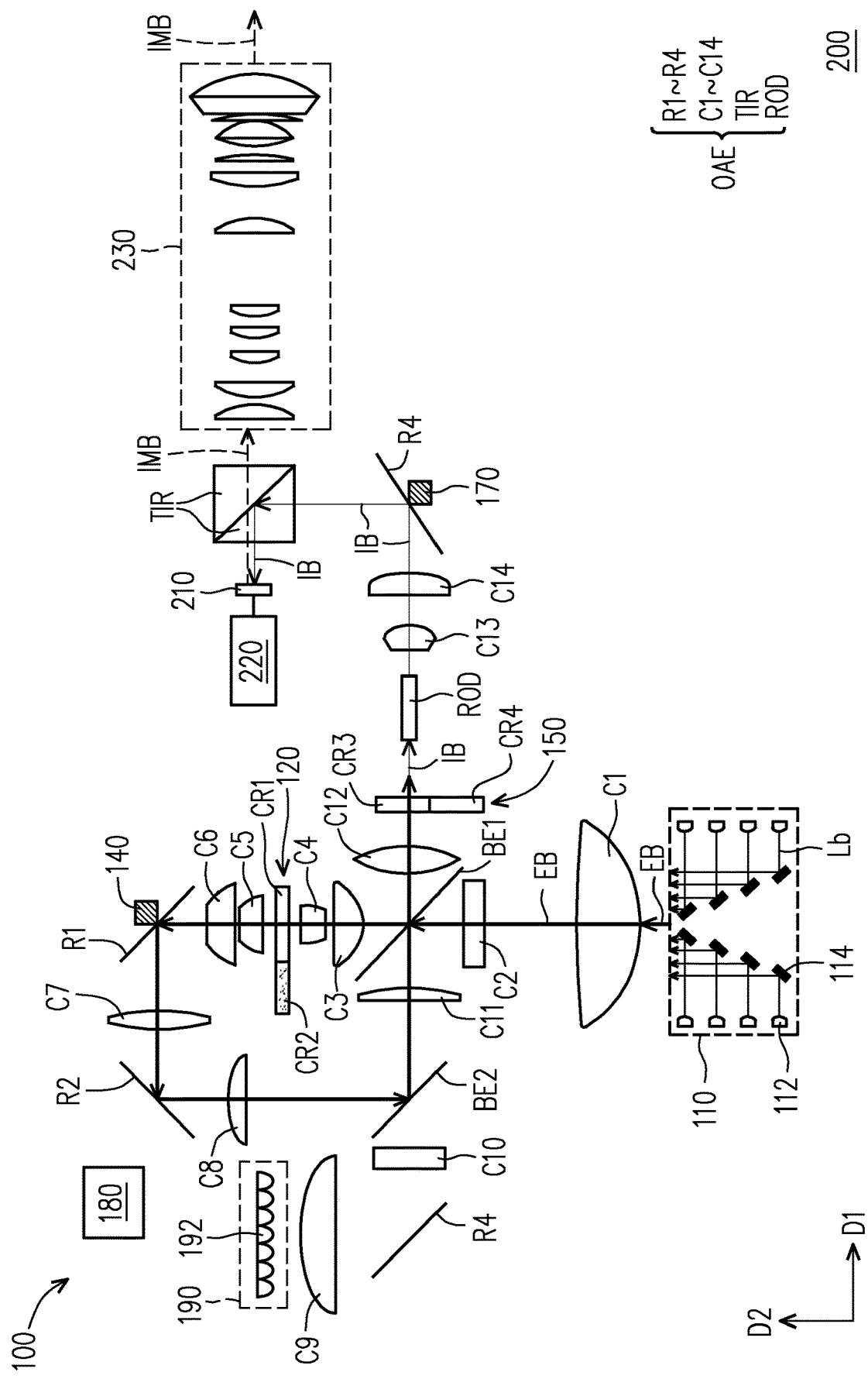
FIG. 1A and FIG. 1B are respectively schematic diagrams of optical paths of a projection device in a first time interval and a second time interval according to an embodiment of the disclosure.
Figure 1B:
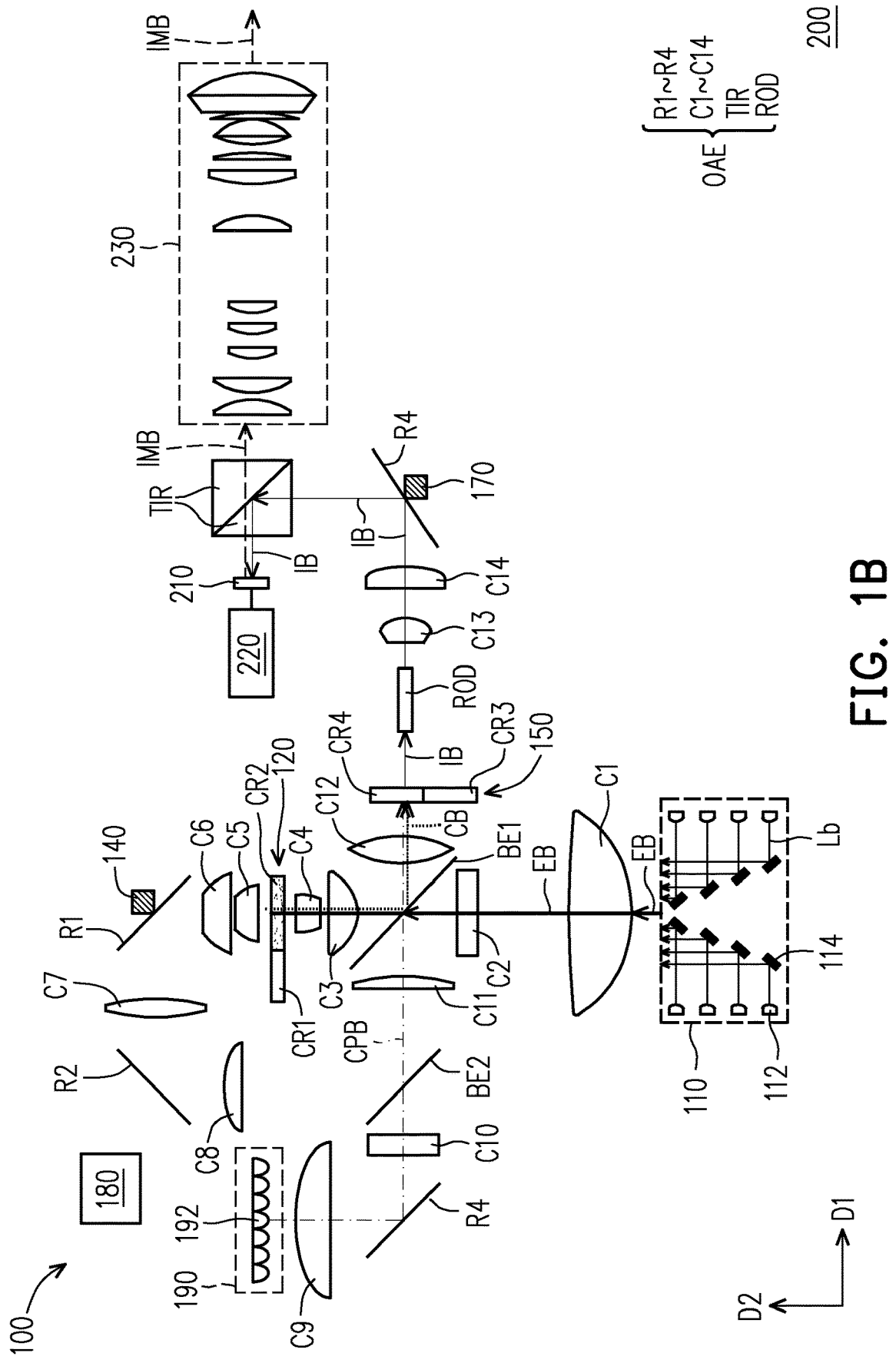
Figure 1C:
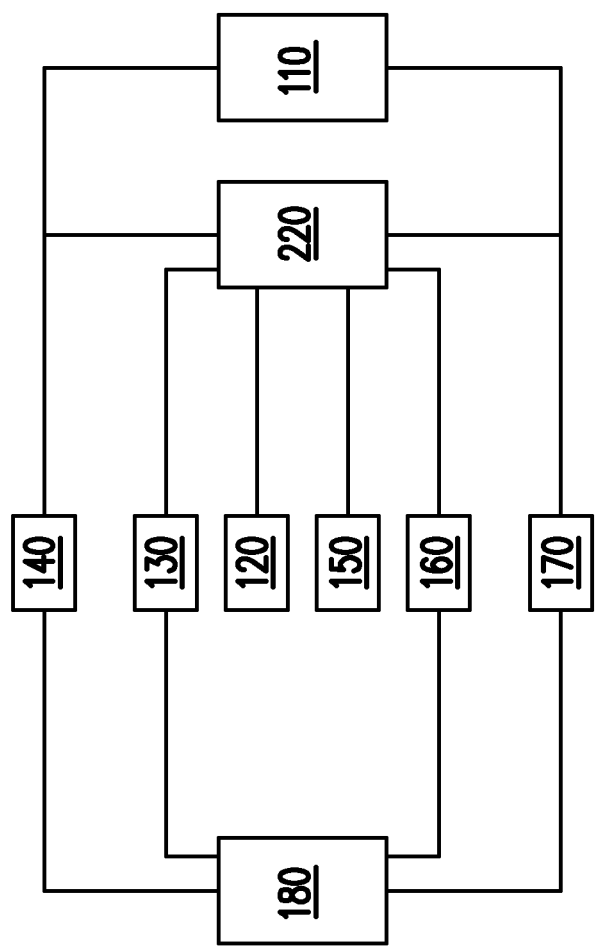
FIG. 1C shows an electrical coupling relationship between a controller and a laser light source, a phosphor wheel, a light filter wheel, first and second light detection modules and a color timing control chip within the projection device.
Figure 2:
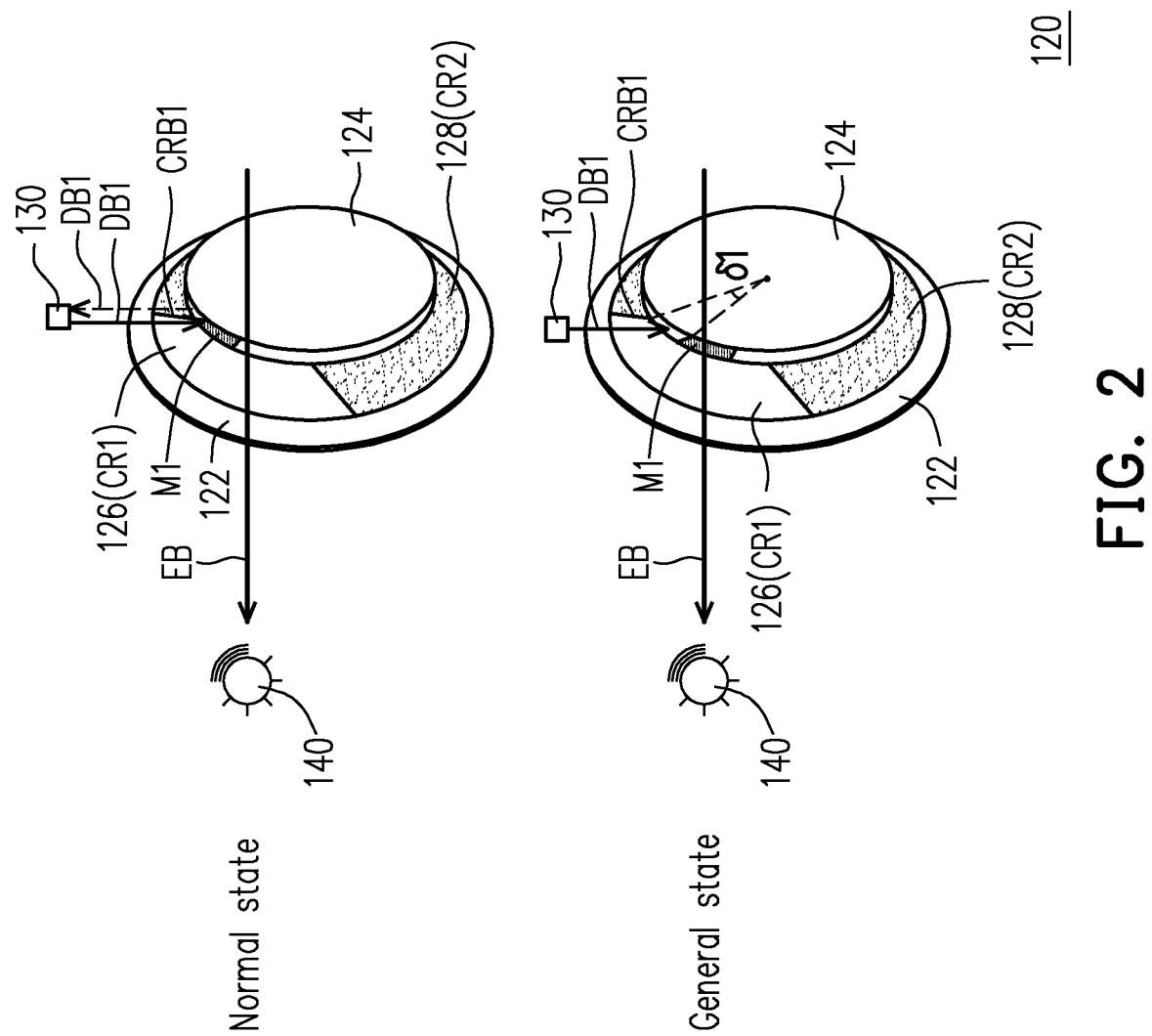
FIG. 2 is a schematic diagram of a phosphor wheel in a normal state and a general state.
Figure 3:
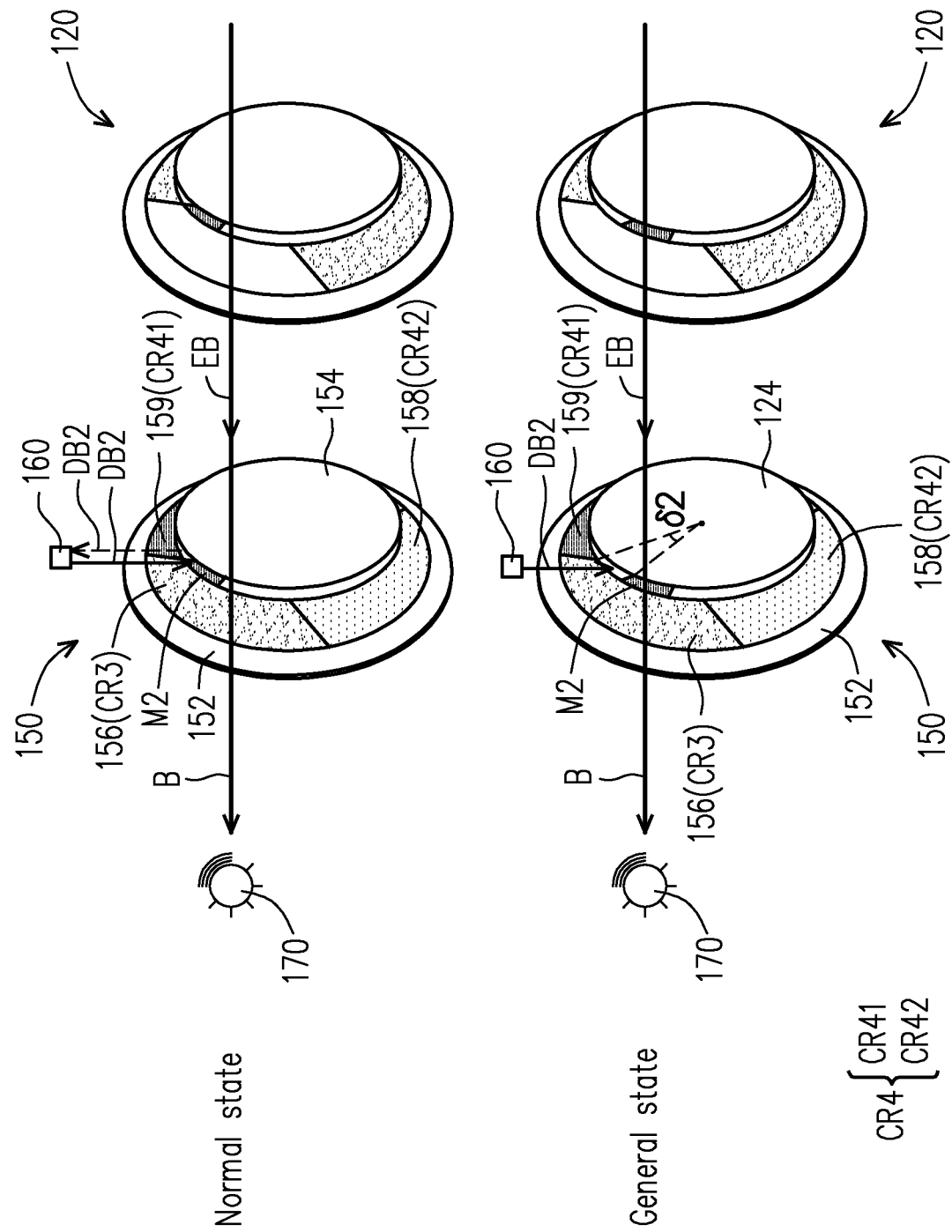
FIG. 3 is a schematic diagram of a light filter wheel and a phosphor wheel in a normal state and a general state.

FIG. 1A and FIG. 1B are respectively schematic diagrams of optical paths of a projection device in a first time interval and a second time interval according to an embodiment of the disclosure. FIG. 1C shows an electrical coupling relationship between a controller and a laser light source, a phosphor wheel, a light filter wheel, first and second light detection modules and a color timing control chip within the projection device. FIG. 2 is a schematic diagram of a phosphor wheel in a normal state and a general state. FIG. 3 is a schematic diagram of a light filter wheel and a phosphor wheel in a normal state and a general state.

Referring to FIG. 1A, FIG. 1B, FIG. 2 and FIG. 3, in the embodiment, the projection device 200 mainly includes an illumination system 100, a light valve 210, a color timing control chip 220 and a projection lens 230. The illumination system 100 is configured to emit an illumination beam IB. The illumination system 100 includes a laser light source 110, a phosphor wheel 120, a first light detection module 130 (in FIG. 2), a first light sensing component 140, a light filter wheel 150, a second light detection module 160 (in FIG. 3), a second light sensing component 170, a controller 180, and light splitting components BE1 and BE2. The above components are explained in detail in the following paragraphs.

First, the components in the illumination system 100 are introduced.

The laser light source 110 is, for example, an optical component assembly configured to provide a laser beam EB, a plurality of light-emitting components arranged in an array, or a single light-emitting component. In the present embodiment, the laser light source 110 is an optical component assembly composed of a plurality of light-emitting components 112 and a plurality of reflecting mirrors 114. The type of the light-emitting components 112 is, for example, a laser diode or a light-emitting diode, but is not limited thereto. In this embodiment, the light-emitting component 112 is, for example, a laser diode. Each of the reflecting mirrors 114 is disposed correspondingly on the optical path of the light-emitting component 112. Therefore, when the light-emitting components 112 respectively emit the laser beam Lb of the blue wavelength band, the laser beam Lb of the blue wavelength band is emitted along the direction D1 (or the opposite direction of the direction D1), then reflected by the corresponding reflecting mirror 114 and exists along the direction D2, and forms the laser beam EB having the blue wavelength band and leaves the laser light source 110. In another embodiment, the laser light source may also be a single light-emitting component, and is, for example, a single blue laser diode, and the disclosure is not limited thereto.

The main function of the phosphor wheel 120 is, for example, an optical component that filters the laser beam EB into different colors of light in different time intervals. In the present embodiment, the phosphor wheel 120 is, for example, a transmissive phosphor wheel. In detail, referring to FIG. 2, the phosphor wheel 120 includes a first substrate 122, a first rotating portion 124, a first driving component (not shown), a first light-transmitting component 126, a phosphor adhesive layer 128 and the first label M1. In other embodiments, there may be multiple phosphor adhesive layers 128 to produce different colors of light. The first light-transmitting component 126 and the phosphor adhesive layer 128 are disposed on the first substrate 112. The first driving component is directly coupled to the first rotating portion 124, and the first rotating portion 124 is directly coupled to the first substrate 122. Therefore, the first driving component can drive the first light-transmitting component 126 and the phosphor adhesive layer 128 to rotate. In this embodiment, the first driving component is, for example, a motor, but is not limited thereto. The first label M1 is disposed on the side wall of the first rotating portion 124.

The phosphor wheel 120 has first and second color regions CR1 and CR2 connected to each other, wherein there is a first color region boundary CRB1 at the junction of the two color regions CR1 and CR2. In detail, the first color region CR1 is defined by the first light-transmitting component 126, for example, and the second color region CR2 is defined by the phosphor adhesive layer 128, for example. The first color region boundary CRB1 is the boundary between the phosphor adhesive layer 128 and the light-transmitting component 126. The phosphor wheel 120 can be controlled by the first driving component to make the first and second color regions CR1 and CR2 enter the optical path of the laser beam EB sequentially. Referring to FIG. 1A, when the first color region CR1 enters the optical path of the laser beam EB, the laser beam EB passes through the first color region CR1 defined by the first light-transmitting component 126, and the phosphor wheel 120 outputs blue light. Referring to FIG. 1B, when the second color region CR2 enters the optical path of the laser beam EB, the phosphor adhesive layer 128 is excited by the laser beam EB to generate a converted beam CB, so that the phosphor wheel 120 outputs the converted beam CB, wherein the converted beam CB is, for example, yellow light. That is, the first color region CR1 is, for example, a blue region that outputs blue light, and the second color region CR2 is, for example, a yellow region that outputs yellow light, but is not limited thereto. In other embodiments, a person skilled in the art can also correspondingly change the type of phosphor powder and the color of laser light source according to the requirements thereof to change the output color of the first and second color regions.

Referring to FIG. 2, the first light detection module 130 is, for example, an optical detection module for detecting the position of the first label M1, for example, a detection light transceiver module. The first light detection module 130 is disposed beside the first rotating portion 124 of the phosphor wheel 120. The first light detection module 130 includes a detection light emitting module and a detection light receiving module (none of them is shown). When the phosphor wheel 120 is controlled to rotate, the detection light emitting module is configured to continuously emit the first detection beam DB1 while the first label M1 on the first rotating portion 124 also rotates. When the first label M1 enters the optical path of the first detection beam DB1, the first label M1 reflects the first detection beam DB1, and the detection light receiving module receives the first detection beam DB1 reflected by the first label M1. In this manner, the first light detection module 130 can acquire the position of the first label M1 according to the reflected first detection beam DB1 and further estimate the rotation state of the phosphor wheel 120. In addition, in this embodiment, the detection light emitting module is, for example, an infrared light emitting module, and the first detection beam DB1 is, for example, an infrared beam, and the first label M1 is, for example, a reflective label, but not limited thereto. The first label M1 may be a black sticker, and the first rotating portion 124 has a reflection function, for example. When the detection light receiving module does not receive the first detection beam DB1 emitted by the detection light emitting module, it means that the first label M1 enters the optical path of the first detection beam DB1. In this manner, the first light detection module 130 can acquire the position of the first label M1 according to not receiving the reflected first detection beam DB1, and further estimate the rotation state of the phosphor wheel 120.

As shown in FIG. 2, the first light sensing component 140 is, for example, a photoelectric component that can convert an optical signal into an electrical signal, and the type thereof includes, for example, a photodiode and a signal circuit board, but not limited thereto. The first light sensing component 140 is an optical signal for sensing the laser beam EB.

As shown in FIG. 3, the main function of the light filter wheel 150 is, for example, to further divide the color light from the phosphor wheel 120 into at least three colors of light, such as red, green, and blue light. As shown in FIG. 3, in the present embodiment, the light filter wheel 150 includes a second substrate 152, a second rotating portion 154, a second driving component (not shown), a second light-transmitting component 156, a red light filter 158, a green light filter 159 and a second label M2. The second light-transmitting component 156 and the red and green light filters 158 and 159 are disposed on the second substrate 152. The second driving component is directly coupled to the second rotating portion 154, and the second rotating portion 154 is directly coupled to the second substrate 152. Therefore, the second driving component can drive the second light-transmitting component 156, the red light filter 158 and the green light filter 159 to rotate. In this embodiment, the second driving component is, for example, a motor. The red light filter 158, for example, only allows the red light to pass through and filters other colors of light. Similarly, the green light filter 159, for example, only allows the green light to pass through and filters other colors of light. Moreover, in some embodiments, the second light-transmitting component 156 can be doped with scattering particles (not shown) to scatter the laser beam EB passing through the second light-transmitting component 156, thereby eliminating the laser speckle problem.

The light filter wheel 150 has third and fourth color regions CR3 and CR4 connected to each other, wherein there is a second color region boundary CRB2 at the junction of the two color regions CR3 and CR4. In detail, the third color region CR3 is defined by the second light-transmitting component 156, for example, and the fourth color region CR4 is defined together by, for example, the green light filter 158 and the red light filter 159. The fourth color region CR4 is composed of two sub-color regions CR41 and CR42, and the sub-color regions CR41 and CR42 are respectively defined by the green light filter 158 and the red light filter 159. The third and fourth color regions CR3 and CR4 respectively correspond to the first and second color regions CR1 and CR2, wherein the corresponding relationship herein refers to the correspondence between the positions of the two in timing: the laser beam EB outputted by the first color region CR1 of the phosphor wheel 120 passes through the third color region CR3 of the light filter wheel 150, and the converted beam CB outputted by the second color region CR2 of the phosphor wheel 120 passes through the fourth color region CR4 of the light filter wheel 150. Therefore, the third color region CR3 is, for example, a blue region that outputs blue light, and the sub-color regions CR41 and CR42 of the fourth color region CR4 are, for example, a green region that outputs green light and a red region that outputs red light, respectively. It should be noted that in order to achieve the above-mentioned corresponding rotation mode, the phosphor wheel 120 and the light filter wheel 150 need to be rotated simultaneously, and the control method for controlling the two color wheels 120 and 150 in detail will be explained in the paragraph below.

Referring to FIG. 3, the second light detection module 160 is, for example, an optical detection module for detecting the position of the second label M2, and the second light detection module 160 is a detection light transceiver module. The second light detection module 160 is disposed beside the second rotating portion 154 of the light filter wheel 150. In detail, the second light detection module 160 includes a detection light emitting module and a detection light receiving module (none of them is shown). When the light filter wheel 150 is controlled to rotate, the detection light emitting module is configured to continuously emit the second detection beam DB2 while the second label M2 on the second rotating portion 154 also rotates. When the second label M2 enters the optical path of the second detection beam DB2, the second label M2 reflects the second detection beam DB2, and the detection light receiving module receives the second detection beam DB2 from the second label M2. In this manner, the second light detection module 160 can acquire the position of the second label M2 according to the reflected second detection beam DB2, and further estimate the rotation state of the filter light wheel 150. In addition, in this embodiment, the detection light emitting module is, for example, an infrared light emitting module, the second detection beam DB2 is, for example, an infrared beam, and the second label M2 is, for example, a reflective label, but not limited thereto.

In other embodiments, the second label M2 may be a black sticker, and the second rotating portion 154 has a reflective function, for example. When the detection light receiving module does not receive the second detection beam DB2 emitted by the detection light emitting module, it means that the second label M2 enters the optical path of the second detection beam DB2. In this manner, the second light detection module 160 can acquire the position of the second label M2 according to not receiving the reflected second detection beam DB2, and further estimate the rotation state of the light filter wheel 150.

The second light sensing component 170 is, for example, an optoelectronic component that can convert an optical signal into an electrical signal, and the type thereof includes, for example, a photodiode, but is not limited thereto. The second light sensing component 170 functions as an optical signal for sensing the laser beam EB forming blue light.

Figure 4:
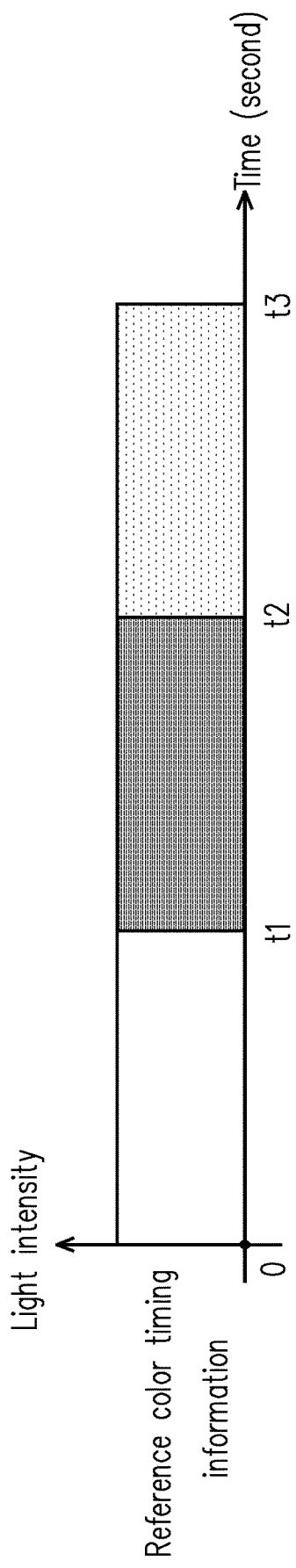
FIG. 4 is a schematic diagram of reference color timing information.

The controller 180 stores the reference color timing information as shown in FIG. 4, and controls the rotation speed of the phosphor wheel 120 and the light filter wheel 150 according to the corresponding parameter acquired by the first and second light sensing components 140 and 170. The controller 180 is, for example, a central processing unit (CPU), or other programmable general-purpose or specific-purpose microprocessor, a digital signal processor (DSP), a programmable controller, an Application Specific Integrated Circuit (ASIC), a Programmable Logic Device (PLD) or other similar devices or a combination of these devices. The control method will be explained in detail in the following paragraphs.

In the present embodiment, another compensation light source 190 may be selectively added inside the illumination system 100, such as an optical component assembly, a plurality of light-emitting components arranged in an array, or a single light-emitting component. The compensation light source 190 is configured to emit a compensation beam CPB and serves to compensate for the light intensity of a certain color light in the illumination system 100. In the present embodiment, the compensation light source 190 is a plurality of light-emitting components 192 arranged in an array. The type of the light-emitting component 192 is, for example, a laser diode or a light-emitting diode, but is not limited thereto. In this embodiment, the light-emitting component 192 is, for example, a red laser diode. Therefore, the compensation light source 190 is, for example, used to enhance the light intensity of red light.

The light splitting components BE1 and BE2 are optical components having a light-splitting function. In this embodiment, the light splitting components BE1 and BE2 are dichroic mirrors (DM) with wavelength selectivity, such as a dichroic piece conducting light splitting by utilizing limitations on wavelengths/colors, but not limited thereto. In the present embodiment, the light splitting component BE1 is, for example, designed to be passed through by blue light and can reflect light beams other than blue light. The light splitting component BE2 is, for example, designed to be passed through by red light and can reflect light beams other than red light.

Next, other components in the projection device 200 will be described.

The type of the light valve 210 includes any one of space light modulators such as a digital micro-mirror device (DMD), a liquid-crystal-on-silicon panel (LCOS Panel), or a liquid crystal panel (LCD), but not limited thereto.

The color timing control chip 220 also stores reference color timing information as shown in FIG. 4 and is electrically coupled to the light valve 210, and controls the light valve 210 to output different colors of image beam IMB from the illumination beam IB in different time intervals according to the reference color timing information of FIG. 4. The color timing control chip 220 is, for example, a digital light processing data processor (DDP, manufactured by TI).

It should be mentioned that the controller 180 can be integrated with the color timing control chip 220 into a control circuit.

The projection lens 230 is, for example, a combination including one or more optical lenses having refractive power, the optical lenses includes, for example, various combinations of non-planar lenses such as biconcave lenses, lenticular lenses, meniscus lenses, convex and concave lenses, plano-convex lenses, and plano-concave lenses. The present disclosure provides no limitation to the form and type of the projection lens 230.

In addition, in the embodiment, a plurality of optical adjustment components OAE may be selectively disposed inside the projection device 200 to be disposed inside the illumination system 100 or on an external optical path. The optical adjustment component OAE can be used to adjust optical properties such as the shape of the light beam, the direction of the optical path, the degree of focusing or divergence of the light in the projection device 200 (or the illumination system 100), which can be, for example, a reflective mirror or a lens (may be converging or diverging lens) or other suitable optical component, the disclosure provides no limitation thereto. These optical adjustment components OAE specifically include a plurality of reflectors R1 to R4, a plurality of lenses C1 to C14, a total internal reflection prism TIR, and a rod integrator ROD.

The arrangement between the main components of the projection device 200 will be described in detail in the following paragraphs.

Referring to FIG. 1A, FIG. 1B, FIG. 2 and FIG. 3, the first and second color regions CR1 and CR2 of the phosphor wheel 120 are disposed on the optical path of the laser beam EB. The light splitting component BE1 is disposed between the laser light source 110 and the phosphor wheel 120, and the light splitting component BE2 is disposed between the compensating light source 190 and the light splitting component BE1. As shown in FIG. 2 and FIG. 3, the first and second light detection modules 130 and 160 are respectively disposed beside the phosphor wheel 120 and the light filter wheel 150. The first and second light sensing components 140 and 170 are disposed beside the transmitting optical path of the laser beam EB, wherein the first light sensing component 140 is disposed downstream of the optical path of the phosphor wheel 120, and the second light sensing component 170 is disposed downstream of the optical path of the light filter wheel 150. In more detail, the first and second light sensing components 140 and 170 are respectively disposed beside the reflectors R1 and R4 (the reflectors R1 and R4 are respectively used as the first and second reflectors), for example, disposed on the rear side of the reflectors R1 and R4 to receive a small amount of laser beam EB.

The light filter wheel 150 is disposed downstream of the optical path of the phosphor wheel 120. The light valve 210 is disposed downstream of the optical path of the light filter wheel 150. The projection lens 230 is disposed downstream of the optical path of the light valve 210. It should be noted that the so-called component A located downstream of the optical path of the component B means that the light beam is transmitted to the component B after passing through the component A, or the light beam generated by the component A is transmitted to the component B.

It should be mentioned that since the first and second light sensing components 140 and 170 are disposed on the rear side of the reflectors R1 and R4, even after the light beam (the laser beam EB or the illumination beam IB) is reflected by the reflectors R1 and R4, there is still a small amount of light beam passing through the reflectors R1 and R4 and sensed by the first and second light sensing components 140 and 170. Such configuration can reduce interference caused by the first and second light sensing components 140 and 170 to the internal optical path (transmitting path of the laser beam EB or the illumination beam IB) of the projection device 200.

Referring to FIG. 1C, in the embodiment, the controller 180 is electrically coupled to the first light detection module 130, the second light detection module 160, and the first and second light sensing components 140 and 170. The color timing control chip 220 is electrically coupled to the first and second light sensing components 140 and 170. The color timing control chip 220 is electrically coupled to the first light detection module 130, the second light detection module 160, the phosphor wheel 120, and the light filter wheel 150. The laser light source 110 is electrically coupled to the first and second light sensing components 140 and 170.

The optical behavior within the illumination system 100 will be described in detail in the following paragraphs.

Referring first to FIG. 1A, FIG. 2 and FIG. 3, in a normal state, in the first time interval, the first rotating portion 124 of the phosphor wheel 120 switches the first color region CR1 into the optical path of the laser beam EB, and the second rotating portion 154 of the light filter wheel 150 switches the third color region CR3 to the optical path of the laser beam EB. Therefore, when the laser light source 110 emits the laser beam EB, the laser beam EB sequentially passes through the lenses C1 and C2, the light splitting component BE1, the lenses C3 and C4, the first color region CR1 of the phosphor wheel 120 and the lenses C5 and C6 along the direction D2, then is reflected by the reflector R1 to change the transmitting direction into an opposite direction of the direction D1, passes through the lens C7 and then is reflected by the reflector R2 to change the transmitting direction into an opposite direction of the direction D2, passes through the lens C8 and then is reflected by the light splitting component BE2 to change the transmitting direction into the direction D1, passes through the lens C11 and then again is emitted toward and passes through the light splitting component BE1, passes through the lens C12, passes through the third color region CR3 of the light filter wheel 150 and then output the laser beam EB with blue light color, wherein the laser beam EB serves as the illumination beam IB in the first time interval.

Further referring to FIG. 1B and FIG. 2, in the normal state, in the second time interval, the first rotating portion 124 of the phosphor wheel 120 switches the second color region CR2 into the optical path of the laser beam EB, and the second rotating portion 154 of the light filter wheel 150 switches the fourth color region CR4 into the optical path of the converted beam CB. Therefore, when the laser light source 110 emits the laser beam EB, the laser beam EB sequentially passes through the lenses C1 and C2, the light splitting component BE, the lenses C3 and C4, and the second color region CR2 of the phosphor wheel 120 along the direction D2. On this occasion, the second color region CR2 is excited by the laser beam EB to generate the converted beam CB. Then, the converted beam CB is retroreflected in the opposite direction of the direction D2, and again passes through the lenses C3 and C4, and is reflected by the light splitting component BE1 to change the transmitting direction to the direction D1 and sequentially passes through the lens C12 and the fourth color region CR4 of the light filter wheel 150. Moreover, in a sub-time interval of the second time interval, the converted beam CB is emitted toward the sub-color region CR41 like the fourth color region CR4 in FIG. 3, and the converted beam CB is filtered by the sub-color region CR41 to form a filter beam with green color light. On the other hand, in another sub-time interval of the second time interval, the converted beam CB is emitted toward the sub-color region CR42 of the fourth color region CR4, and the converted beam CB is filtered by the sub-color region CR42 to form a filter beam with red color light. Therefore, in the second time interval, the converted beam CB filtered by the light filter wheel 150 is used as at least a part of the illumination beam IB.

Referring further to FIG. 1B, in another sub-time interval of the second time interval, if the intensity of the red light is to be enhanced, the compensation light source 190 may be turned on to make the compensation light source 190 to emit the compensation beam CPB. After the compensating beam CPB is emitted, the compensating beam CPB sequentially passes through the lens C9, is reflected by the reflector R4, passes through the lens C10, the light splitting component BE2, the lens C11, the light splitting component BE1, the lens C12, and the sub-color region CR42 of the fourth color region CR4 of the light filter wheel 150. Therefore, in the second time interval, not only the converted beam CB filtered by the light filter wheel 150 is used as the illumination beam IB, but also the required color light can be additionally provided through the compensation method, and the compensation beam CPB can be used as at least a part of the illumination beam IB. In other words, the converted beam CB filtered by the light filter wheel 150 and the compensating beam CPB are collectively used as the illumination beam IB. Therefore, by additionally providing the compensation light source 190, the red light intensity of the image projected by the projection device 200 can be improved.

The optical behavior outside the illumination system 100 will be described in detail in the following paragraphs.

Referring to FIG. 1A and FIG. 1B, after the illumination beam IB is outputted, the illumination beam IB sequentially passes through the rod integrator ROD, the lenses C13 and C14, and is reflected by the reflector R4, and is reflected by the total internal reflection prism TIR to the light valve 210. In the case of first time interval (in $0 \sim t_1$ seconds), the color timing control chip 220 controls the light valve 210 to convert the illumination beam IB into the image beam IMB having blue light according to the reference color timing information in FIG. 4, wherein the reference color timing information serves as the preset color timing information. In the case of second time interval (in $t_1 \sim t_3$ seconds), the color timing control chip 220 controls the light valve 210 to convert the illumination beam IB into the image beam IMB having green light or red light according to the reference color timing information of FIG. 4. Finally, the image beam IB sequentially passes through the total internal reflection prism TIR and is transmitted to the projection lens 230, so that the projection lens 230 projects a colored image screen.

As the above shows, in the normal state, it is required for the illumination system 100 to output the illumination beam IB having the correct illumination color in the first and second time intervals to correspond to the reference color timing information in the color timing control chip 220. Therefore, when the color timing control chip 220 controls the light valve 210 according to the reference color timing information, the light valve 210 can convert the illumination beam IB having the correct illumination color into the correct image beam IMB.

However, in the normal state, the phosphor wheel 120 does not necessarily convert the preset correct color beam in the correct time interval. Moreover, the first and second color regions CR1 and CR2 of the phosphor wheel 120 also need to be respectively aligned with the third and fourth color regions CR3 and CR4 of the light filter wheel 150, such that the illumination beam IB projected by the illumination system 100 can project the correct color light in the required time interval. In other words, in the general state, due to the assembly tolerance, the regions of the phosphor wheel 120 and light filter wheel 150 are not necessarily aligned with each other, as a result, before the projection device 200 of the present embodiment projects the image beam IMB, it is required to perform a calibrating operation on the phosphor wheel 120 and the light filter wheel 150.

In the following paragraphs, FIG. 4 to FIG. 6 will be incorporated to explain the manner through which the phosphor wheel 120 and the light filter wheel 150 are calibrated.

Figure 5:
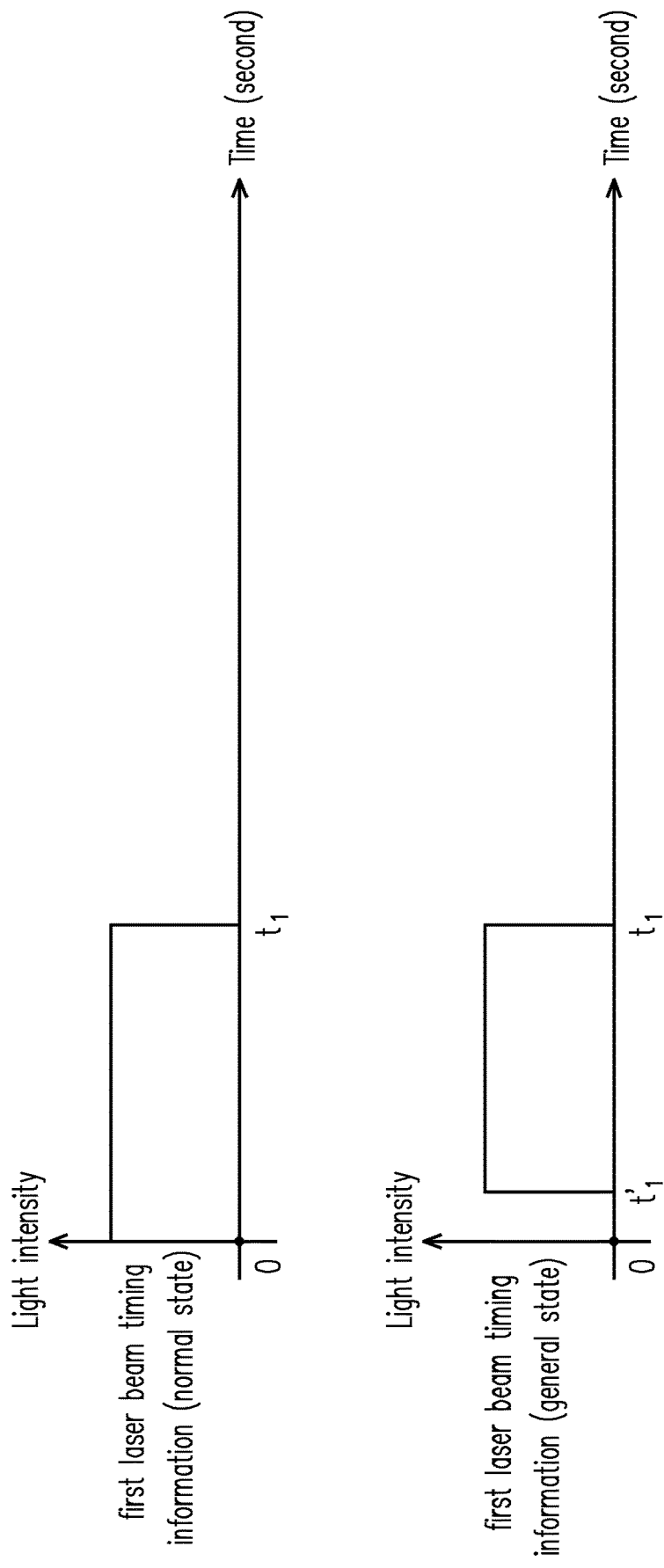
FIG. 5 shows the first laser beam timing information in a normal state and a general state.

FIG. 5 shows the first laser beam timing information in a normal state and a general state. FIG. 6 shows the blue light beam timing information in a normal state and a general state.

In this embodiment, both the controller 180 and the color timing control chip 220 store the reference color timing information in FIG. 4, and the reference color timing information is used as the preset color timing information. The controller 180 stores the first preset value, and the following paragraphs will explain the function of the first preset value. Referring to FIG. 2, first, the controller 180 calibrates the phosphor wheel 120 according to the reference color timing information of FIG. 4.

Referring to FIG. 2, the first rotating portion 124 of the phosphor wheel 120 rotates the first substrate 122, thereby driving the first and second color regions CR1 and CR2 to rotate, and the first label M1 located on the first rotating portion 124 also rotates simultaneously. When the first label M1 enters the optical path of the first detection beam DB1, the first detection beam DB1 is reflected by the first label M1 and received by the first light detection module 130.

In other embodiments, during a period of the rotation of the phosphor wheel 120, the first detection beam DB1 is absorbed by the first label M1 and is not detected by the first light detection module 130. Therefore, it depends on whether the first label M1 is an absorbing component (such as a black tape) or a reflective component (such as a reflective sheet).

Figure 1D:
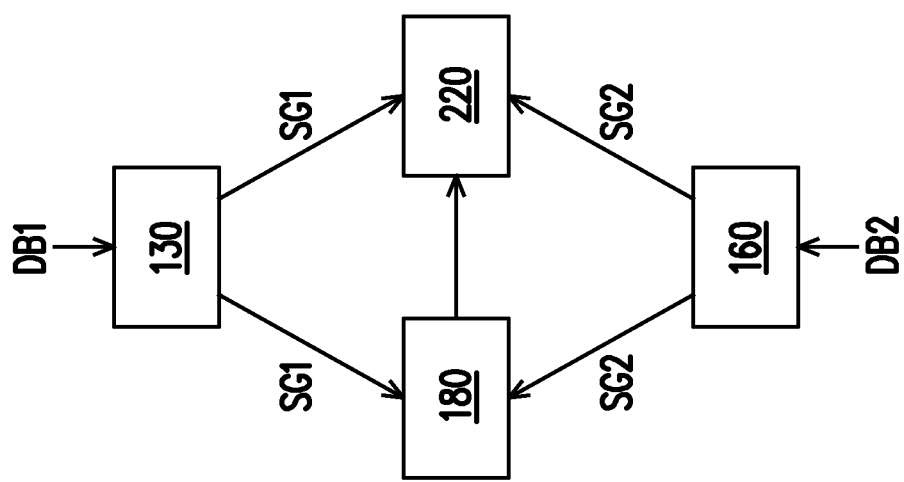
FIG. 1D shows an electrical coupling relationship between a laser light source, a color timing control chip, and first and second light detection modules.

Referring to FIG. 1D, on this circumstances, the first light detection module 130 issues a first notification signal SG1 to notify the controller 180 and notify the color timing control chip 220 that the subsequent period should be the blue color time interval. In addition, the controller 180 is electrically coupled to the color timing control chip 220. Therefore, during the period in which the first color region CR1 is cut into the optical path of the laser beam EB, the laser beam EB is sensed with the first laser beam timing information as shown in FIG. 5 by the first light sensing component 140, wherein the upper half and the lower half of FIG. 5 respectively show the first laser beam timing information in the normal state and the general state.

On this occasion, the controller 180 determines the first displacement value δ1 between the first label M1 and the first color region boundary CRB1 according to the first laser beam timing information of FIG. 5 and the reference color timing information of FIG. 4. In detail, the controller 180 compares the first parameter of the first laser beam timing information with the second parameter of the reference color timing information, wherein the first and second parameters are, for example, the maximum light intensity in the time interval, light-receiving start time, light-receiving end time or light irradiation period. In the following paragraphs, the first and second parameters are exemplified as light irradiation period.

The controller 180 first refers to a sub-reference color timing information in the reference color timing information of FIG. 4 and the first laser beam timing information in FIG. 5, wherein the color of the sub-reference color timing information corresponds to the color of the first laser beam timing information, that is, the waveform diagram shown in $0 \sim t_1$ seconds in FIG. 4, where $t_1$ is greater than 0. Therefore, the controller 180 acquires, according to the sub-reference color timing information, that the first light sensing component 140 should receive the light irradiation for $t_1$ seconds in the normal state.

The following discusses cases in the normal state and the general state respectively.

If the first light sensing component 140 happens to measure the first laser beam timing information in the normal state in the upper half of FIG. 5, the controller 180 can learn that the first light sensing component 140 is irradiated for $t_1$ seconds. Thereafter, the controller 180 compares the first laser beam timing information with the sub-reference color timing information in FIG. 4, and the so-called comparison is made, for example, by performing subtraction on the irradiation time of the two to obtain a comparison result (that is, 0 seconds). After the controller 180 acquires the comparison result (0 seconds), the first displacement value δ1 between the first label M1 and the first color region boundary CRB1 is determined according to the comparison result. In detail, the controller 180 can estimate an angular displacement value between the first label M1 and the first color region boundary CRB1 relative to the first rotating portion 124 according to the product of the rotation speed $\omega_1$ of the phosphor wheel 120 and the comparison result ($\omega1*$comparison result). Since the comparison result of this state is 0 seconds, and the first displacement value δ1 is exactly 0. The controller 180 compares the first displacement value δ1 with the first preset value. The first preset value is, for example, Δθ, wherein Δθ is greater than 0. The first preset value may be set according to the requirement of color. If the first displacement value δ1 exceeds the first preset value, it means that the color error is too large and not acceptable, if the first displacement value δ1 is smaller than or equal to the first preset value, it means the color error is acceptable. In other words, the first preset value can be regarded as the tolerance for the color error. After comparison, it can be obtained that the first displacement value (0 degrees) is smaller than the first preset value (Δθ), so the controller 180 can know that the color light outputted by the phosphor wheel 120 conforms to the reference color timing information, and there is no need to adjust the rotation speed of the phosphor wheel 120.

If the first light sensing component 140 happens to measure the first laser beam timing information in the general state in the lower half of FIG. 5, the controller 180 can learn that the first light sensing component 140 is irradiated for $t_1'$~$t_1$ seconds. Next, the controller 180 compares the first laser beam timing information with the sub-reference color timing information of FIG. 4, for example, by performing subtraction on the light irradiation time of the two to obtain a comparison result (that is, $t_1'$ seconds). After the controller 180 acquires the comparison result ($t_1'$ seconds), the first displacement value δ1 between the first label M1 and the first color region boundary CRB1 is determined according to the comparison result. In detail, the controller 180 can estimate an angular displacement value between the first label M1 and the first color region boundary CRB1 relative to the first rotating portion 124 according to the product of the rotation speed $\omega_1$ of the phosphor wheel 120 and the comparison result ($\omega1*t_1'$). Since the comparison result of this state is $t_1'$ seconds, and the first displacement value δ1 is exactly $\omega1*t_1'$. On this occasion, the controller 180 compares the first displacement value δ1 with the first preset value. There are two possibilities after comparison; one is that the first displacement value δ1 ($\omega1*t_1'$) is smaller than or equal to the first preset value (Δθ), and the other one is that the first displacement value δ1 ($\omega1*t_1'$) is greater than the first preset value (Δθ).

If the first displacement value δ1($\omega1*t_1'$) is smaller than or equal to the first preset value (Δθ), it means that the difference in the irradiation color of the illumination beam IB outputted by the illumination system IB in this case is acceptable, then the controller 180 may not need to adjust the rotation speed.

If the first displacement value δ1 ($\omega1*t_1'$) is greater than the first preset value (Δθ), which means that the difference in the irradiation color of the illumination beam IB outputted by the illumination system IB in this case is not acceptable, then the controller 180 adjusts the rotation speed of the phosphor wheel 120. In this embodiment, since the first displacement value δ1 ($\omega1*t_1'$) is greater than the first preset value (Δθ), the controller 180 first chooses to decelerate the rotation speed of the phosphor wheel 120, that is, adjusting the rotation speed $\omega_1$ to the rotation speed $\omega_1'$ (wherein $\omega_1'$ is smaller than $\omega1$), and then the above steps are repeated until the first displacement value δ1 becomes smaller than the first preset value. On this occasion, the calibration of the phosphor wheel 120 is substantially completed.

It should be noted that in other embodiments, the controller 180 may also select parameters other than the irradiation time. For example, if the first and second parameters are the light-receiving start time, the controller 180 will look for the 0th second in the time interval 0~$t_1$ seconds in FIG. 4 as the light-receiving start time, and the second parameter is the 0th second of the time interval 0~$t_1$ seconds in the normal state in FIG. 5 as the light-receiving start time, or the $t_1'$ second of the time interval $t_1'$~$t_1$ seconds in the normal state in FIG. 5 as the light-receiving start time, thereby estimating the magnitude of the first displacement value. The light-receiving end time is also similar to the light-receiving start time described above, except that the end time in the time interval is selected. The maximum light intensity means the integral value of the light intensity and the time interval, and the corresponding calculation method can also be used to estimate the magnitude of the first displacement value. In other embodiments, the magnitude of the first displacement value can also be estimated through different parameters, and the disclosure provides no limitation thereto.

Then, after the phosphor wheel 120 is completely adjusted/calibrated, the light filter wheel 150 can be adjusted.

In a similar manner, the second rotating portion 154 of the light filter wheel 150 is driven first to rotate the second substrate 152, thereby driving the third and fourth color regions CR3 and CR4 to rotate. At the same time, the second label M2 located on the second rotating portion 154 also rotates. When the second label M2 enters the optical path of the second detection beam DB2, the second detection beam DB2 is reflected by the second label M2 and received by the second light detection module 170.

Referring to FIG. 1D, on this occasion, the second light detection module 170 issues a second notification signal SG2 to notify the controller 180 and notify the color timing control chip 220 that the subsequent period should be the blue color time interval. Therefore, during the period in which the third color region CR3 is cut into the optical path of the laser beam EB, the laser beam EB forms a blue light beam B through a filter of the third color region CR3, and the blue light beam B is sensed with the blue light beam timing information as shown in FIG. 6 by the second light sensing component 170, wherein the upper half and the lower half of FIG. 6 respectively show the blue light beam timing information in the normal state and the general state.

Figure 6:
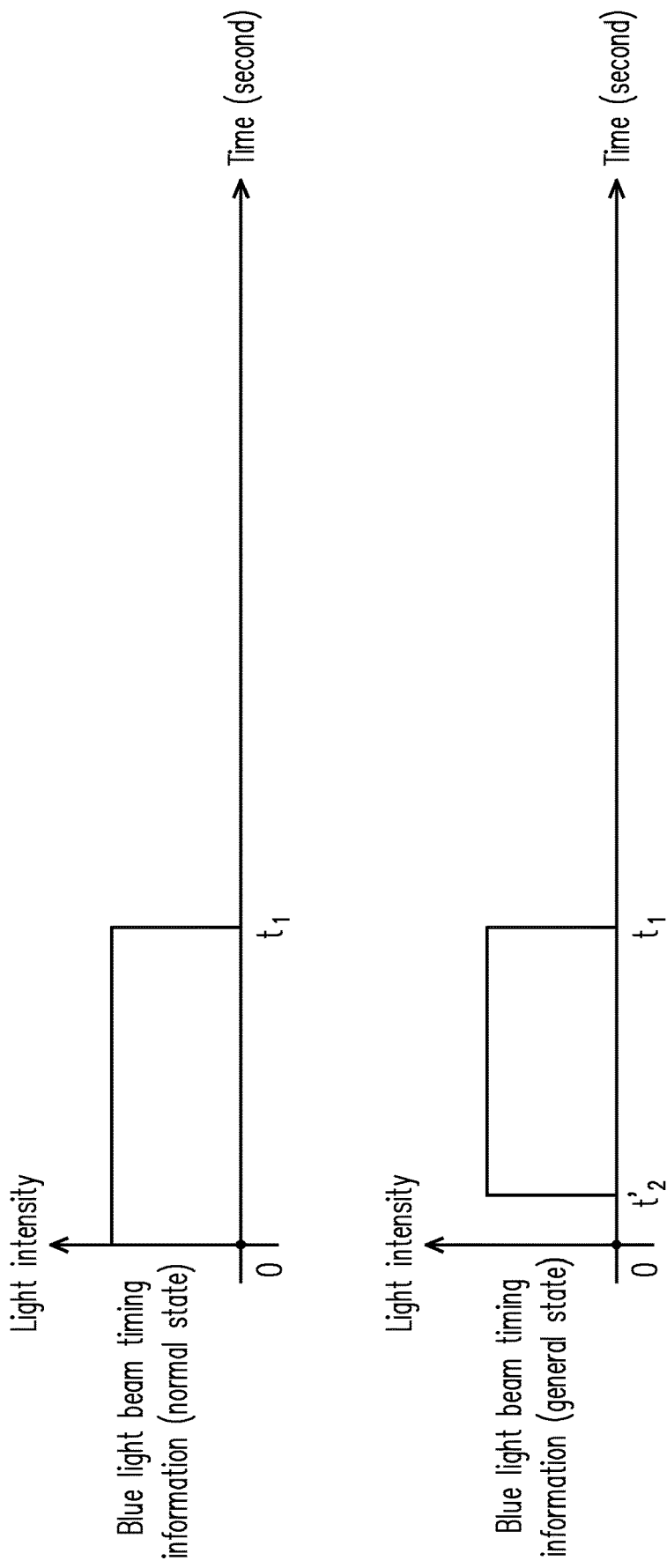
FIG. 6 shows the blue light beam timing information in a normal state and a general state.

On this occasion, the controller 180 determines the second displacement value between the second label M2 and the second color region boundary CRB2 according to the blue light beam timing information as shown in FIG. 6 and the reference color timing information as shown in FIG. 4. In detail, the controller 180 compares the third parameter of the blue light beam timing information with the second parameter of the reference color timing information, wherein the third and second parameters are, for example, the maximum light intensity in the time interval, the light-receiving start time, the light-receiving end time or the light irradiation period. In the following paragraphs, the third and second parameters are exemplified as light irradiation period.

The controller 180 first refers to the sub-reference color timing information in the reference color timing information in FIG. 4 and the blue light beam timing information in FIG. 6, wherein the color of the sub-reference color timing information corresponds to the color of the blue light beam timing information, that is, the waveform diagram shown in $0 \sim t_1$ seconds in FIG. 6, wherein $t_1$ is greater than 0. Therefore, the controller 180 knows, according to the sub-reference color timing information in FIG. 4, that the second light sensing component 170 should be irradiated for $t_1$ seconds under the normal state.

The following discusses cases in the normal state and the general state respectively.

If the second light sensing component 170 happens to measure the blue light beam timing information in the normal state in the upper half of FIG. 6, the controller 180 can learn that the second light sensing component 170 is irradiated for $t_1$ seconds. Next, the controller 180 compares the blue light beam timing information with the sub-reference color timing information, for example, by performing subtraction on the light irradiation time of the two to obtain a comparison result (that is, 0 seconds). After the controller 180 acquires the comparison result (0 seconds), the second displacement value $\delta 2$ between the second label M2 and the second color region boundary CRB2 is determined according to the comparison result. In detail, the controller 180 can estimate an angular displacement value between the second label M2 and the second color region boundary CRB2 relative to the second rotating portion 154 according to the product of the rotation speed $\omega_2$ of the light filter wheel 150 and the comparison result ($\omega_2$*comparison result). Since the comparison result of this state is 0 seconds, and the second displacement value $\delta 2$ is exactly 0. On this occasion, the controller 180 compares the second displacement value $\delta 2$ with the first displacement value $\delta 1$ (the calibrated first displacement value $\delta 1$ between the first label M1 and the first color region boundary CRB1 or the first displacement value $\delta 1$ needs no be calibrated after comparison) by, for example, performing subtraction on the first displacement value $\delta 1$ and the second displacement value $\delta 2$ to obtain a displacement difference ($\delta 1 - \delta 2$). The controller 180 also stores a second preset value, the description thereof is similar to the description of the first preset value, and is not repeated herein.

In the blue light beam timing information of the upper half of FIG. 6, since the light filter wheel 150 is in the normal state, the displacement difference is smaller than the second preset value, then there is no need to adjust the rotation speed of the filter color wheel 150.

If the second light sensing component 170 happens to measure the blue light beam timing information in the general state in the lower half of FIG. 6, the controller 180 can learn that the second light sensing component 170 is irradiated for $t_2' \sim t_1$ seconds. Next, the controller 180 compares the blue light beam timing information with the sub-reference color timing information, for example, by performing subtraction on the light irradiation time of the two to obtain a comparison result (that is, $t_2'$ seconds). After the controller 180 acquires the comparison result ($t_2'$ seconds), the second displacement value $\delta 2$ between the second label M2 and the second color region boundary CRB2 is determined according to the comparison result. In detail, the controller 180 can estimate an angular displacement value between the second label M2 and the second color region boundary CRB2 relative to the second rotating portion 154 according to the product of the rotation speed $\omega_2$ of the light filter wheel 150 and the comparison result ($\omega_2$*$t_2'$). Since the comparison result of this state is $t_2'$ seconds, and the second displacement value $\delta 2$ is exactly $\omega_2$*$t_2'$. On this occasion, the controller 180 compares the second displacement value $\delta 2$ with the first displacement value $\delta 1$ to obtain a displacement difference ($\delta 1 - \delta 2$). There are two possibilities after comparison; one is that the displacement difference is smaller than or equal to the second preset value, and the other one is that the displacement difference is greater than the second preset value.

If the displacement difference is smaller than or equal to the second preset value, it means that the first and second color regions CR1 and CR2 of the phosphor wheel 120 in this case substantially or completely correspond to the third and fourth color regions CR3 and CR4 of the light filter wheel 150, and thus the difference in the irradiation color of the illumination beam IB outputted by the illumination system IB is acceptable, and the controller 180 may not need to adjust the rotation speed of the light filter wheel 150.

If the displacement difference is greater than the second preset value, it means that the difference in the irradiation color of the illumination beam IB outputted by the illumination system IB in this case is not acceptable, then the controller 180 adjusts the rotation speed of the light filter wheel 150 and the above steps are repeated until the displacement difference becomes smaller than the second preset value, at which time the calibration of the light filter wheel 150 is substantially completed.

It should be noted that in other embodiments, the controller 180 may also select parameters other than the irradiation time as the third and second parameters, the description thereof is substantially similar to the selection of the first and second parameters described above, and no repetition is incorporated herein.

In addition, the above-mentioned phosphor wheel is exemplified by a transmissive phosphor wheel. In other embodiments, a reflective phosphor color wheel (not shown) may also be used, and the main difference between the two is that the first color region of the transmissive phosphor wheel is defined by the first light-transmitting component, and the first color region of reflective phosphor wheel is defined by the reflective component. In the reflective phosphor wheel, the first color region of the reflective phosphor wheel has a reflective component for reflecting a laser beam back to the light splitting component, and the present disclosure provides no limitation to the type of the phosphor wheel.

Figure 7A:
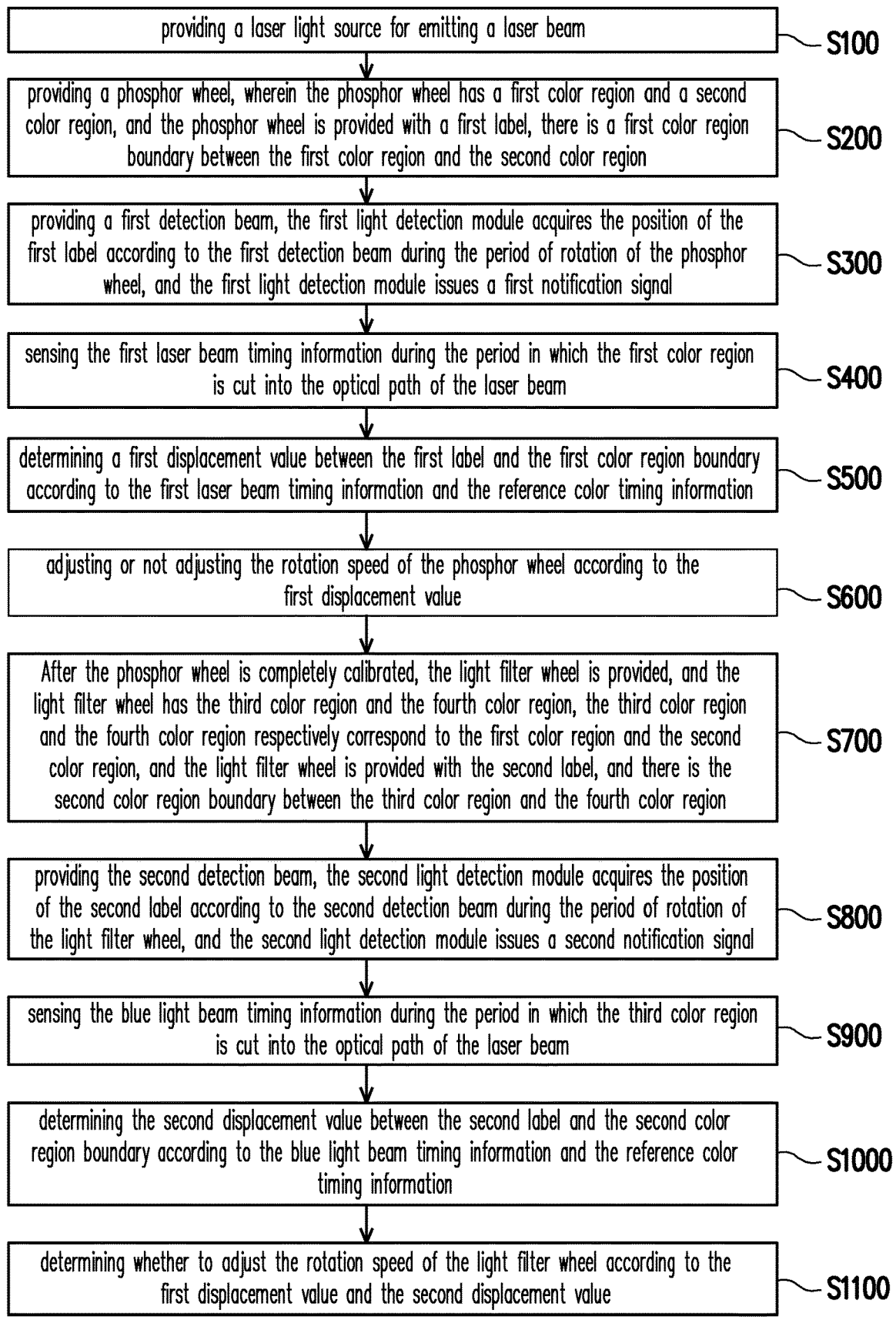
FIG. 7A is a schematic flow chart of a color wheel calibrating method according to an embodiment of the present disclosure.

FIG. 7A is a schematic flow chart of a color wheel calibrating method according to an embodiment of the present disclosure. FIG. 7B and FIG. 7F are respectively flow charts of sub-steps in a step of the color wheel calibrating method.

Referring to FIG. 7A, the color wheel calibrating method of the embodiment includes the following steps S100~S1100.

Step S100: providing a laser light source for emitting a laser beam.

Step S200: providing a phosphor wheel, wherein the phosphor wheel has a first color region and a second color region, and the phosphor wheel is provided with a first label, there is a first color region boundary between the first color region and the second color region.

Step S300: providing a first detection beam, the first light detection module acquires the position of the first label according to the first detection beam during the period of rotation of the phosphor wheel, and the first light detection module issues a first notification signal.

Step S400: sensing the first laser beam timing information during the period in which the first color region is cut into the optical path of the laser beam.

Step S500: determining a first displacement value between the first label and the first color region boundary according to the first laser beam timing information and the reference color timing information. Referring to FIG. 7B, step S500 further includes step S510, wherein step S510 is as follows: comparing the first parameter of the first laser beam timing information with the second parameter of the sub-reference color timing information in the reference color timing information to determine the first displacement value.

Step S600: adjusting or not adjusting the rotation speed of the phosphor wheel according to the first displacement value. Referring to FIG. 7C, step S600 further includes step S610, wherein step S610 is as follows: determining whether to adjust the rotation speed of the phosphor wheel according to the first displacement value and the first preset value. Referring to FIG. 7D, step S610 further includes step S612, wherein step S612 is as follows: if the first displacement value is smaller than or equal to the first preset value, the rotation speed of the phosphor wheel is not adjusted. If the first displacement value is greater than the first preset value, the rotation speed of the phosphor wheel is adjusted.

Step S700: After the phosphor wheel is completely calibrated, the light filter wheel is provided, and the light filter wheel has the third color region and the fourth color region, the third color region and the fourth color region respectively correspond to the first color region and the second color region, and the light filter wheel is provided with the second label, and there is the second color region boundary between the third color region and the fourth color region.

Step S800: providing the second detection beam, the second light detection module acquires the position of the second label according to the second detection beam during the period of rotation of the light filter wheel, and the second light detection module issues a second notification signal. In other embodiments, after the adjustment of the phosphor wheel is completed, during the period of the rotation of the light filter wheel, the second detection beam is reflected by the second label and is received by the second light detection module, which depends on whether the second label is an absorbing component (such as a black tape) or a reflective component (such as a reflective sheet).

Step S900: sensing the blue light beam timing information during the period in which the third color region is cut into the optical path of the laser beam.

Step S1000: determining the second displacement value between the second label and the second color region boundary according to the blue light beam timing information and the reference color timing information. Referring to FIG. 7E, step S1000 further includes step S1010: comparing the third parameter of the blue light beam timing information with the second parameter of the sub-reference color timing information in the reference color timing information to determine the second displacement value.

Step S1100: determining whether to adjust the rotation speed of the light filter wheel according to the first displacement value and the second displacement value. Referring to FIG. 7F, step S1100 further includes step S1110: determining whether to adjust the rotation speed of the light filter wheel according to a displacement difference between the second displacement value and the first displacement value. Referring to FIG. 7G, step S1110 further includes step S1112: if the displacement difference is smaller than or equal to the second preset value, the rotation speed of the light filter wheel is not adjusted. If the displacement difference is greater than the second preset value, the rotation speed of the light filter wheel is adjusted.

As described above, in the illumination system and the projection device of the embodiment of the disclosure, the controller or the color timing control chip stores the reference color timing information, wherein the reference color timing information is used as the preset color timing information. The controller senses the first laser beam timing information and the reference color timing information of the laser beam entering the first color region of the phosphor wheel through the first light sensing component, thereby determining the first displacement value between the first label and the first color region boundary on the phosphor wheel, and further determining whether to adjust the rotation speed of the phosphor wheel according to the first displacement value and the first preset value. Through the above adjustment method, the phosphor wheel can output the light beam with correct color in different time intervals. Therefore, the illumination system and the projection device have good optical quality, and calibration can be completed without projecting the projection image, the calibration speed thereof is fast, and the equipment requirements of the production line are saved. Meanwhile, the inconsistency between manual calibration and the judgment based on naked eye in the known art can also be avoided.

Further, after the phosphor wheel is calibrated, the controller can further sense the blue light beam timing information and the reference color timing information of the laser beam entering the third color region of the light filter wheel through the second light sensing component, thereby determining the first displacement value between the second label and the second color region boundary on the light filter wheel, and further determining whether to adjust the rotation speed of the light filter wheel according to the first and second displacement values, so that synchronous calibration of double wheel can be realized.

In the color wheel calibrating method of embodiment of the present disclosure, a first color region boundary is formed between the first and second color regions of the phosphor wheel, and the first label is provided therein. The color wheel calibrating method senses the laser beam passing through the first color region of the phosphor wheel to obtain the first laser beam timing information, and determines the first displacement value between the first label and the first color region boundary of the phosphor wheel according to the first laser beam timing information and the reference color timing information, thereby adjusting or not adjusting the rotation speed of the phosphor wheel according to the first displacement value. Therefore, the illumination system and the projection device applying the color wheel calibrating method of the embodiment of the present disclosure can have good optical quality, and can be calibrated without projecting a projection image. Moreover, the color wheel calibrating method of the embodiment of the present disclosure has a faster calibration speed.

Further, in the color wheel calibrating method of the embodiment of the present disclosure, after the phosphor wheel is calibrated, a light filter wheel may be further provided. A second color region boundary is formed between the third and fourth color regions of the light filter wheel and a second label is provided therein. The color wheel calibrating method senses the blue light beam passing through the third color region of the light filter wheel to obtain the blue light beam timing information, and determines the second displacement value between the second label and the second color region boundary of the light filter wheel according to the blue light beam timing information and the reference color timing information, thereby adjusting or not adjusting the rotation speed of the light filter wheel according to the first and second displacement values, so that synchronous calibration of double wheel can be realized.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An illumination system, comprising:
a laser source configured to emit a laser beam;
a phosphor wheel disposed in an optical path of the laser beam, wherein the phosphor wheel has a first color region and a second color region, the phosphor wheel is disposed with a first label, a first color region boundary is formed between the first color region and the second color region;
a first light detection module disposed beside the phosphor wheel and configured to emit a first detection beam;
a first light sensing component disposed adjacent to the optical path of the laser beam and configured to receive the laser beam, wherein the first light sensing component is located at downstream of the phosphor wheel on the optical path of the laser beam; and
a controller electrically coupled to the first light detection module and the first light sensing component, and the controller storing reference color timing information,
wherein,
during a period of rotation of the phosphor wheel, the first light detection module acquires a position of the first label according to the first detection beam, the first light detection module issues a first notification signal to notify the controller,
and during a period in which the first color region is cut into the optical path of the laser beam, the laser beam passes through the first color region and is sensed with first laser beam timing information by the first light sensing component,
wherein the controller determines a first displacement value between the first label and the first color region boundary according to the first laser beam timing information and the reference color timing information, and further determines, according to the first displacement value, whether to adjust a rotation speed of the phosphor wheel or not.

2. The illumination system of claim 1, wherein the controller stores a first preset value and compares a first parameter of the first laser beam timing information with a second parameter of sub-reference color timing information of the reference color timing information to determine the first displacement value, wherein the controller determines to adjust the rotation speed of the phosphor wheel according to the first displacement value and the first preset value.

3. The illumination system of claim 2, wherein
if the first displacement value is smaller than or equal to the first preset value, the rotation speed of the phosphor wheel is not adjusted;
if the first displacement value is greater than the first preset value, the rotation speed of the phosphor wheel is adjusted.

4. The illumination system of claim 2, wherein the first parameter and the second parameter comprise a maximum light intensity, a light-receiving start time, a light-receiving end time, or a light irradiation period.

5. The illumination system of claim 1, further comprising a first reflector disposed on the optical path of the laser beam and the first light sensing component disposed beside the first reflector.

6. The illumination system of claim 1, further comprising:
a light filter wheel disposed at downstream of the phosphor wheel on the optical path of the laser beam, wherein the light filter wheel has a third color region and a fourth color region, and the third color region and the fourth color region respectively correspond to the first color region and the second color region, wherein the light filter wheel is provided with a second label, and a second color region boundary is formed between the third color region and the fourth color region;

a second light detection module disposed beside the light filter wheel and configured to emit a second detecting beam; and a second light sensing component provided adjacent to the optical path of the laser beam and disposed at downstream of the light filter wheel on the optical path of the laser beam, wherein the controller is electrically coupled to the second light detection module and the second light sensing component, wherein after the phosphor wheel is adjusted, during the period of the rotation of the light filter wheel, the second light detection module acquires a position of the second label according to the second detection beam, the second light detection module issues a second notification signal to notify the controller, when the third color region is cut into an optical path of a blue light beam, the second light sensing component senses blue light beam timing information, wherein the controller adjusts a second displacement value between the second label and the second color region boundary according to the blue light beam timing information and the reference color timing information, and further determines to adjust a rotation speed of the light filter wheel according to the first displacement value and the second displacement value.

7. The illumination system of claim 6, wherein the controller compares a third parameter of the blue light beam timing information with a second parameter of sub-reference color timing information of the reference color timing information to determine the second displacement value, wherein the controller determines, according to a displacement difference between the second displacement value and the first displacement value, to adjust the rotation speed of the light filter wheel.

8. The illumination system of claim 7, wherein
the controller stores a second preset value,
if the displacement difference is smaller than or equal to the second preset value, the rotation speed of the light filter wheel is not adjusted;
if the displacement difference is greater than the second preset value, the rotation speed of the light filter wheel is adjusted.

9. The illumination system of claim 7, wherein the second parameter and the third parameter comprise a maximum light intensity, a light-receiving start time, a light-receiving end time, or a light irradiation period.

10. The illumination system of claim 6, wherein
the first color region is a blue region, and the second color region is a yellow region, the third color region is a blue region, and the fourth color region at least comprises a green region and a red region.

11. The illumination system of claim 6, wherein the second light sensing component is disposed adjacent to a second reflector and located at downstream of the light filter wheel on the optical path of the laser beam.

12. A projection device, wherein the projection device comprises:
an illumination system comprising:
a laser source configured to emit a laser beam;
a phosphor wheel provided on an optical path of the laser beam, wherein the phosphor wheel has a first color region and a second color region, the phosphor wheel is provided with a first label, a first color region boundary is formed between the first color region and the second color region, wherein the laser beam at least passes through the phosphor wheel to output an illumination beam;

a first light detection module disposed beside the phosphor wheel and configured to emit a first detection beam;

a first light sensing component disposed adjacent to the optical path of the laser beam and configured to receive the laser beam, wherein the first light sensing component is located at downstream of the phosphor wheel on the optical path of the laser beam; and a controller electrically coupled to the first light detection module and the first light sensing component, and the controller storing reference color timing information;

a light valve disposed on an optical path of the illumination beam and converting the illumination beam into an image beam; and a projection lens disposed on a transmitting path of the image beam, wherein, during a period of rotation of the phosphor wheel, the first light detection module acquires a position of the first label according to the first detection beam, the first light detection module issues a first notification signal to notify the controller, and during a period in which the first color region is cut into the optical path of the laser beam, the laser beam passes through the first color region and is sensed with first laser beam timing information by the first light sensing component, wherein the controller determines a first displacement value between the first label and the first color region boundary according to the first laser beam timing information and the reference color timing information, and further determines, according to the first displacement value whether to adjust a rotation speed of the phosphor wheel or not.

13. The projection device of claim 12, wherein the controller stores a first preset value and compares a first parameter of the first laser beam timing information with a second parameter of sub-reference color timing information of the reference color timing information to determine the first displacement value, wherein the controller determines to adjust the rotation speed of the phosphor wheel according to the first displacement value and the first preset value.

14. The projection device of claim 13, wherein
if the first displacement value is smaller than or equal to the first preset value, the rotation speed of the phosphor wheel is not adjusted;
if the first displacement value is greater than the first preset value, the rotation speed of the phosphor wheel is adjusted.

15. The projection device of claim 13, wherein the first parameter and the second parameter comprise a maximum light intensity, a light-receiving start time, a light-receiving end time, or a light irradiation period.

16. The projection device of claim 12, wherein the illumination system further comprises a first reflector disposed on the optical path of the laser beam and the first light sensing component is disposed beside the first reflector.

17. The projection device of claim 12, wherein the illumination system further comprises:
a light filter wheel disposed at downstream of the phosphor wheel on the optical path of the laser beam, wherein the light filter wheel has a third color region and a fourth color region, and the third color region and the fourth color region respectively correspond to the first color region and the second color region, wherein the light filter wheel is provided with a second label, and a second color region boundary is formed between the third color region and the fourth color region, wherein the laser beam passes through the phosphor wheel and the light filter wheel to output the illumination beam;

a second light detection module disposed adjacent to the light filter wheel and configured to emit a second detecting beam;

a second light sensing component disposed adjacent to the optical path of the laser beam and disposed at downstream of the light filter wheel on the optical path of the laser beam, wherein the controller is electrically coupled to the second light detection module and the second light sensing component;

wherein, after the adjustment of the phosphor wheel is completed, during the period of the rotation of the light filter wheel, the second light detection module acquires a position of the second label according to the second detection beam, the second light detection module issues a second notification signal to notify the controller, when the third color region is cut into an optical path of blue light beam, the second light sensing component senses blue light beam timing information, wherein the controller determines a second displacement value between the second label and the second color region boundary according to the blue light beam timing information and the reference color timing information, and further determines to adjust a rotation speed of the light filter wheel according to the first displacement value and the second displacement value.

18. The projection device of claim 17, wherein the controller compares a third parameter of the blue light beam timing information with a second parameter of sub-reference color timing information of the reference color timing information to determine the second displacement value, wherein the controller determines, according to a displacement difference between the second displacement value and the first displacement value, to adjust the rotation speed of the light filter wheel.

19. The projection device of claim 18, wherein
the controller stores a second preset value,
if the displacement difference is smaller than or equal to the second preset value, the rotation speed of the light filter wheel is not adjusted;
if the displacement difference is greater than the second preset value, the rotation speed of the light filter wheel is adjusted.

20. The projection device of claim 18, wherein the second parameter and the third parameter comprise a maximum light intensity, a light-receiving start time, a light-receiving end time, or a light irradiation period.

21. The projection device of claim 17, wherein,
the first color region is a blue region, and the second color region is a yellow region,
the third color region is a blue region, and the fourth color region at least comprises a green region and a red region.

22. A color wheel calibrating method, wherein the calibrating method comprises:
providing a laser light source configured to emit a laser beam;
providing a phosphor wheel having a first color region and a second color region, wherein the phosphor wheel is provided with a first label, and a first color region boundary is formed between the first color region and the second color region;

providing a first detection beam, wherein in a period of rotation of the phosphor wheel, a first light detection module acquires a position of the first label according to the first detection beam, the first light detection module issues a first notification signal;

sensing first laser beam timing information during a period in which the first color region is cut into an optical path of the laser beam;

determining, according to the first laser beam timing information and reference color timing information, a first displacement value between the first label and the first color region boundary; and determining, according to the first displacement value, whether to adjust a rotation speed of the phosphor wheel or not.

23. The calibrating method of claim 22, wherein in the step of determining the first displacement value between the first label and the first color region boundary according to the first laser beam timing information and the reference color timing information, further comprising:
comparing a first parameter of the first laser beam timing information with a second parameter of sub-reference color timing information of the reference color timing information to determine the first displacement value.

24. The calibrating method of claim 22, wherein in the step of determining whether to adjust the rotation speed of the phosphor wheel according to the first displacement value and a first preset value,
if the first displacement value is smaller than or equal to the first preset value, the rotation speed of the phosphor wheel is not adjusted;
if the first displacement value is greater than the first preset value, the rotation speed of the phosphor wheel is adjusted.

25. The calibrating method of claim 23, wherein the first parameter and the second parameter comprise a maximum light intensity, a light-receiving start time, a light-receiving end time, or a light irradiation period.

26. The calibrating method of claim 22, further comprising:
after the phosphor wheel is calibrated,
providing a light filter wheel, wherein the light filter wheel has a third color region and a fourth color region, the third color region and the fourth color region respectively correspond to the first color region and the second color region, and the light filter wheel is provided with a second label, and a second color region boundary is formed between the third color region and the fourth color region;

providing a second detection beam, wherein in a period of rotation of the light filter wheel, the second light detection module acquires a position of the second label according to the second detection beam, the second light detection module issues a second notification signal;

sensing blue light beam timing information during a period in which the third color region is cut into the optical path of the laser beam;

determining, according to the blue light beam timing information and the reference color timing information, a second displacement value between the second label and the second color region boundary; and determining whether to adjust a rotation speed of the light filter wheel according to the first displacement value and the second displacement value.

27. The calibrating method of claim 26, wherein in the step of determining the second displacement value between the second label and the second color region boundary according to the blue light beam timing information and the reference color timing information, further comprising:
  comparing a third parameter of the blue light beam timing information with a second parameter of sub-reference color timing information of the reference color timing information to determine the second displacement value.

28. The calibrating method of claim 27, wherein the second parameter and the third parameter comprise a maximum light intensity, a light-receiving start time, a light-receiving end time, or a light irradiation period.

29. The calibrating method of claim 26, wherein in the step of determining whether to adjust the rotation speed of the light filter wheel according to the first displacement value and the second displacement value, further comprising:
  determining whether to adjust the rotation speed of the light filter wheel according to a displacement difference between the second displacement value and the first displacement value.

30. The calibrating method of claim 29, wherein in the step of determining whether to adjust the rotation speed of the light filter wheel according to the displacement difference between the second displacement value and the first displacement value, wherein:
  if the displacement difference is smaller than or equal to a second preset value, the rotation speed of the light filter wheel is not adjusted;
  if the displacement difference is greater than the second preset value, the rotation speed of the light filter wheel is adjusted.

* * * * *